United States Patent
LaGasse

(10) Patent No.: US 7,231,151 B2
(45) Date of Patent: *Jun. 12, 2007

(54) COSITE INTERFERENCE REJECTION SYSTEM USING AN OPTICAL APPROACH

(75) Inventor: Michael J LaGasse, Lexington, MA (US)

(73) Assignee: The Boeing Company, Chicago, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 11/208,941

(22) Filed: Aug. 22, 2005

(65) Prior Publication Data

US 2006/0210281 A1   Sep. 21, 2006

Related U.S. Application Data

(63) Continuation of application No. 09/944,974, filed on Aug. 31, 2001, now Pat. No. 6,934,476.

(51) Int. Cl.
   *H04B 10/00* (2006.01)

(52) U.S. Cl. ............ 398/135; 398/137; 398/139; 398/115; 398/140; 398/182; 398/183; 398/188; 398/192; 398/194; 398/195; 398/202; 398/208; 398/209; 455/296; 455/63; 455/673; 455/82; 455/83; 455/303; 455/304; 455/206; 342/381; 342/382; 342/383; 342/384; 375/211; 375/222; 375/102; 375/39

(58) Field of Classification Search ......... 398/135, 398/137, 139, 115, 140, 182, 183, 188, 192, 398/194, 195, 202, 208, 209; 455/296, 63, 455/673, 82, 83, 303, 304, 206; 342/381, 342/382, 383, 384; 375/211, 222, 102, 39

See application file for complete search history.

(56) References Cited

U.S. PATENT DOCUMENTS

| | | | |
|---|---|---|---|
| 4,660,042 A | 4/1987 | Ekstrom | |
| 5,117,505 A | 5/1992 | Talwar | |
| 5,428,831 A | 6/1995 | Monzello et al. | |
| 5,548,838 A | 8/1996 | Talwar et al. | |
| 5,574,978 A | 11/1996 | Talwar et al. | |
| 5,724,169 A | 3/1998 | LaGasse | 398/141 |
| 6,731,881 B2 | 5/2004 | Nomura | 398/135 |
| 6,934,476 B2* | 8/2005 | LaGasse | 398/135 |

* cited by examiner

*Primary Examiner*—Hanh Phan
(74) *Attorney, Agent, or Firm*—Harness, Dickey & Pierce, P.L.C.

(57) ABSTRACT

A cosite interference rejection system allows cancellation of large interfering signals with an optical cancellation subsystem. The rejection system includes an interference subsystem coupled to a transmit system, where the interference subsystem weights a sampled transmit signal based on a feedback signal such that the weighted signal is out of phase with the sampled transmit signal. The optical cancellation subsystem is coupled to the interference subsystem and a receive antenna. The optical cancellation subsystem converts an optical signal into a desired receive signal based on an interfering coupled signal and the weighted signal. The weighted signal is therefore used to drive the optical cancellation subsystem. The rejection system further includes a feedback loop for providing the feedback signal to the interference subsystem based on the desired receive signal.

19 Claims, 2 Drawing Sheets

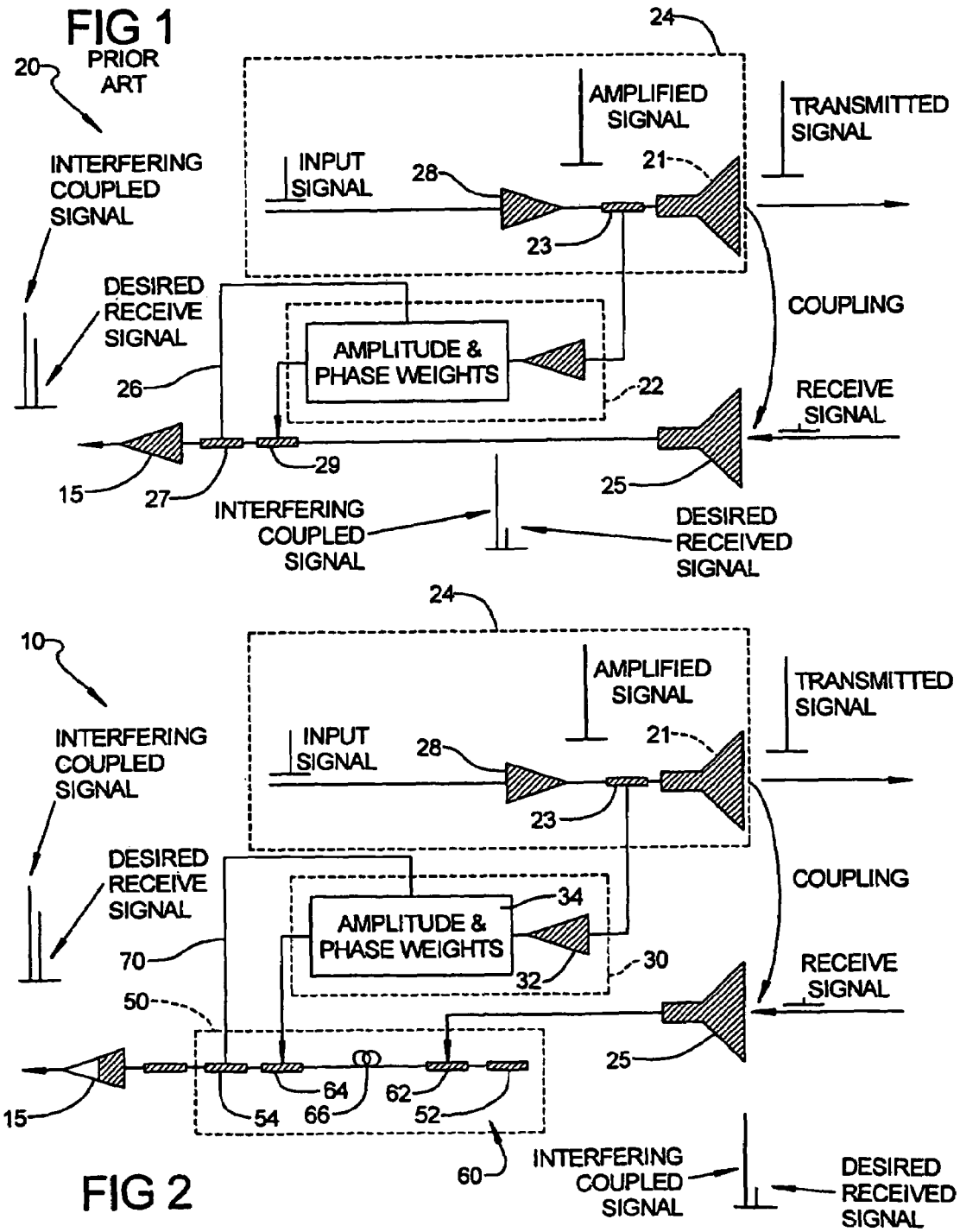

COSITE INTERFERENCE REJECTION SYSTEM USING AN OPTICAL APPROACH

CROSS-REFERENCE TO RELATED APPLICATIONS

This application is a continuation of U.S. patent application Ser. No. 09/944,974 filed on Aug. 31, 2001 now U.S. Pat. No. 6,934,476, the disclosure of which is incorporated herein by reference.

FIELD OF THE INVENTION

The present invention relates generally to cosite interference rejection systems. More particularly, the invention relates to a cosite interference rejection system having an optical cancellation subsystem.

BACKGROUND OF THE INVENTION

Modern commercial and military aviation applications often require communication systems to transmit high power RF signals in the presence of relatively small RF receive signals. In fact, there is a growing demand in the commercial aircraft industry to increase the number of radios present on a given platform. Similarly, the defense industry is constantly increasing the required number of signals to be simultaneously transmitted and received. Given the limited amount of space available on most platforms, it is therefore easy to understand that high power transmit antennas may interfere with nearby receive antennas. In fact, a typical transmit antenna will radiate hundreds or thousands of watts of power, whereas the power of the desired receive signal will be a fraction of that. If the receive antenna is located in relatively close proximity to the transmit antenna, residual transmitted power will be coupled to the nearby receive antenna. The result is saturation of the low noise amplifier (LNA) associated with the receive antenna. While the common sense approach to this problem is to physically separate the receive antenna from the transmit antenna, on platforms such as aircraft, helicopters, spacecraft, ships, and building tops, such a solution may not be possible due to limited space. Another solution is to use a cosite interference rejection system to cancel the coupled power from the interfering coupled signal obtained by the receive antenna.

A modern day interference rejection system is shown in FIG. 1 at 20. Generally, it can be seen that a transmit system 24 amplifies an input signal with a power amplifier 28 for transmission with a transmit antenna 21. The transmit signal is commonly sampled by a 10 dB coupler 23 for use by an interference subsystem 22. The interference subsystem 22 amplitude and phase weights the sampled transmit signal based on a feedback signal such that the weighted signal is effectively out of phase with the sampled transmit signal. A cancellation coupler 29 couples the weighted signal to an interfering coupled signal obtained from a nearby receive antenna 25. It is important to note that cancellation occurs in the electrical domain. Thus, the cancellation coupler 29 functions as an electrical cancellation subsystem. A feedback loop 26 provides the feedback signal to the interference subsystem 22 based on the desired receive signal produced by the cancellation coupler 29. The feedback loop 26 typically uses a feedback coupler 27 to effectively sample the desired receive signal. The desired receive signal is then passed on to an LNA 15 for amplification.

While the above described conventional interference rejection system 20 partially addresses the issue of cosite interference, there is still room for considerable improvement. For example, the conventional interference rejection system 20 is limited in the amount of coupled power that can be cancelled. In fact, when the coupled power exceeds the threshold of the rejection system 20, the system 20 can no longer transmit and receive simultaneously. The result can be a loss of information. This problem is generally due to the non-linearity of the electrical components used in the system 20. Specifically, the exact reduction in amplitude of the interfering signal depends on how accurately the phase and amplitude of the weighted signal matches the interfering signal. The combination of a high level interfering signal and loss in the couplers 23, 27, 29 makes it difficult for the interference subsystem 22 to maintain linearity. When the linearity degrades, the cancellation performance may be reduced. Eventually, as the interfering levels increase, large signals will reach the input to the LNA 15 causing saturation and additional non-linearities. Under these conditions, it is not possible to receive low-level signals near the system noise floor, and information will be lost. It is therefore desirable to provide a cosite interference rejection system that does not fall subject to the non-linearities associated with high level interfering signals.

Another concern relates to applications where weight distribution is important. For example, it is well known that conventional interference rejection systems can significantly effect the distribution of weight on modern day aircraft. In fact, it is quite difficult to arrange the components of the rejection system to redistribute weight towards the center of gravity in order to improve performance of the aircraft. This is largely due to the electrical nature of the components and connections associated with conventional interference rejection systems. It is therefore desirable to provide a cosite interference rejection system that allows for more efficient weight distribution.

SUMMARY OF THE INVENTION

The above and other objectives are provided by a cosite interference rejection system in accordance with the present invention having an optical cancellation subsystem. Specifically, the rejection system includes an interference subsystem coupled to a transmit system, where the interference subsystem weights a sampled transmit signal based on a feedback signal such that the weighted signal is out of phase with the sampled transmit signal. The optical cancellation subsystem is coupled to the interference subsystem and a receive antenna. The optical cancellation subsystem converts an optical signal into a desired receive signal based on an interfering coupled signal and the weighted signal. The rejection system further includes a feedback loop for providing the feedback signal to the interference subsystem based on the desired receive signal. Using the optical cancellation subsystem to convert an optical signal into the desired receive signal allows the above problems associated with non-linearity to be eliminated.

Further, in accordance with the present invention, an optical cancellation subsystem is provided. The preferred optical cancellation subsystem has an optical source for generating an optical signal, a modulation network coupled to the optical source, a receive antenna and an interference subsystem. The modulation network phase modulates the optical signal based on an interfering coupled signal from the receive antenna and a weighted signal from the interference subsystem. A demodulation system is coupled to the modulation network, where the demodulation system demodulates the phase modulated optical signal to generate a desired receive signal.

The present invention also provides a method for rejecting cosite interference. The method includes the step of weighting a sampled transmit signal based on a feedback signal such that the weighted signal is out of phase with the sampled transmit signal. An optical signal is converted into a desired receive signal based on an interfering coupled signal and the weighted signal. The method further provides for generating the feedback signal based on the desired receive signal.

Further areas of applicability of the present invention will become apparent from the detailed description provided hereinafter. It should be understood that the detailed description and specific examples, while indicating various preferred embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 is a block diagram of a conventional cosite interference rejection system useful in understanding the present invention;

FIG. 2 is a block diagram of a cosite interference rejection stem in accordance with a preferred embodiment of the present invention;

DETAILED DESCRIPTION OF THE PREFERRED EMBODIMENTS

Figure 4:
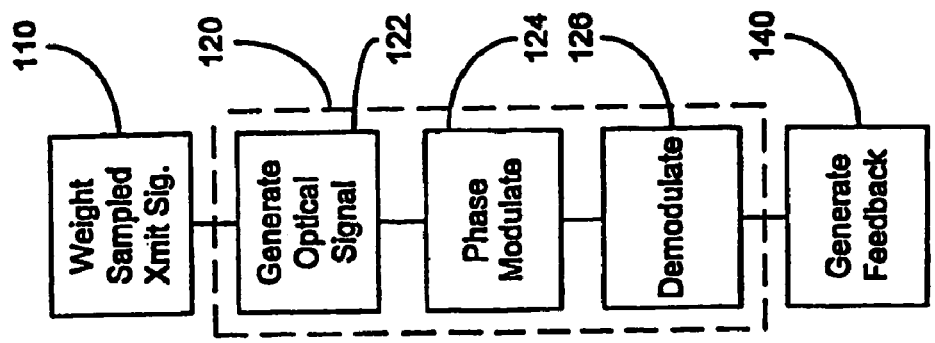
FIG. 4 is a flowchart of a process for converting an optical signal into a desired receive signal in accordance with the principles of the present invention.

The following description of the preferred embodiment(s) is merely exemplary in nature and is in no way intended to limit the invention, its application, or uses.

Turning now to FIG. 2, the preferred cosite interference rejection system is shown at 10. Generally, the rejection system 10 has an interference subsystem 30, an adaptive optical cancellation subsystem 50, and a feedback loop 70. It can be seen that the interference subsystem 30 is coupled to a transmit system 24. The interference subsystem 30 amplitude and phase weights a sampled transmit signal based on a feedback signal such that the weighted signal is out of phase with the sampled transmit signal. The weighted signal is therefore also out of phase with the actual transmitted signal. It can also be seen that the interference subsystem 30 has an amplifier 32 for amplifying the sampled transmit signal, in addition to an amplitude and phase module 34 for weighting the sampled transmit signal.

The optical cancellation subsystem 50 is coupled to the interference subsystem 30 and a receive antenna 25. The receive antenna 25 is located in close enough proximity to the transmit antenna 21 for power transmitted by the transmit system 24 to be coupled to the receive antenna 25. The result is an interfering coupled signal made up of both the transmitted signal and the desired receive signal. It can be seen that the optical cancellation subsystem 50 converts an optical signal into the desired receive signal based on the interfering coupled signal and the weighted signal.

The feedback loop 70 provides the feedback signal to the interference subsystem 30 based on the desired receive signal. The rejection system 10 may further include an LNA 15 if amplification is necessary. In fact, the optical cancellation subsystem 50 is effectively able to set the system noise figure, and therefore behaves like a very high-dynamic range, low-noise amplifier. It is important to note that under the conventional electronic approach, the LNA is required and the large interfering signal must be removed before the LNA. If this is not done, non-linearities will degrade the system noise figure.

In one preferred embodiment, the optical cancellation subsystem 50 includes an optical source 52, a modulation network 60, and a demodulation system 54. It will be appreciated that the optical source 52 can be a laser or any other device capable of generating a modulatable optical signal. The modulation network 60 is coupled to the optical source 52, the receive antenna 25, the interference subsystem 30, and the demodulation system 54. The modulation network 60 phase modulates the optical signal based on the interfering coupled signal and the weighted signal. The demodulation system 54 is coupled to the modulation network 60 and the feedback loop 70, where the demodulation system 54 demodulates the phase modulated optical signal to obtain the desired receive signal.

It is highly preferred that the modulation network 60 includes a first modulator 62 coupled to the optical source 52 and the receive antenna 25. The first modulator 62 phase modulates the optical signal based on the interfering coupled signal. The modulation network 60 further includes a second modulator coupled to the interference subsystem 30, where the second modulator 64 phase modulates the optical signal based on the weighted signal. The weighted signal therefore functions as a drive signal to the second modulator 64. It is important to note that this approach is quite different to that of conventional approaches wherein the weighted signal is merely coupled to the interfering coupled signal in the electrical domain. A fiber optic subsystem 66 transfers the optical signal from the first modulator 62 to the second modulator 64.

It is important to note that the use of low-loss fiber optics allows the different subsystems to be more efficiently located. For example, the first modulator 62 can be located at the receive antenna 25, where it can immediately set the system noise figure. The second modulator 64 and the components associated with the feedback loop 70 can be located in a central, conveniently accessible electronics bay. Hence, in an aircraft application, redistributing weight toward the center of gravity can improve the performance of the aircraft. This concept can be extended using techniques well known in the art to allow several systems to share cancellation hardware through a fiber switched network. This type of architecture reduces weight and cost, and increases performance.

Figure 3:
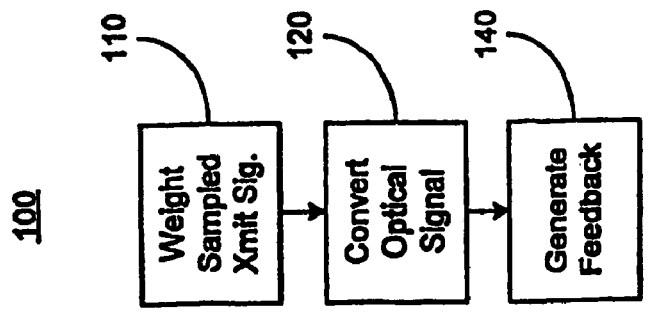
FIG. 3 is a flowchart of a method for rejecting cosite interference in accordance with the principles of the present invention.

Thus, FIG. 3 shows a method 100 for rejecting cosite interference in accordance with the present invention for programming purposes. It will be appreciated that method 100 can be readily implemented with a combination of hardware and software using techniques well known in the art. It therefore can be seen that at step 110 a sampled transmit signal is weighted based on a feedback signal such that the weighted signal is out of phase with the sampled transmit signal. At step 120, an optical signal is converted into a desired receive signal based on an interfering coupled signal and the weighted signal. The method further provides for generating the feedback signal at step 140 based on the desired receive signal.

The preferred approach to converting the optical signal at step 120 is shown in FIG. 4. Specifically, it can be seen that at step 122 the optical signal is generated, and at step 124 the optical signal is phase modulated based on the interfering coupled signal and the weighted signal. As already discussed, phase modulation preferably occurs via a first phase modulator based on the interfering coupled signal, and a second phase modulator based on the weighted signal. The optical signal can be transferred to the second phase modulator with a fiber optic subsystem as already discussed. The process at step 120 further includes the step 126 of demodulating the phase modulated optical signal.

Returning now to FIG. 2, it will be appreciated that multiplexing the large interfering signal with the second modulator 64 eliminates the RF loss associated with the cancellation coupler used in the conventional approach. This is significant because the amplifier driving the second modulator 64 has lower power and is more linear than all-electric cancellation subsystems. This increase in linearity gives a better cancellation ratio over a higher range of coupled power. Furthermore, high dynamic range optical links having a laser, optical phase modulator, and optical phase demodulator are commercially available. In fact, mathematical models are able to predict the performance of the link with high accuracy. The result is negligible non-linearities in the phase modulation process. Publications by the Navy Research Laboratory, and MIT Lincoln Laboratory have demonstrated noise figures below 3 dB, and modulators that have sufficient sensitivity to operate at frequencies below 1 GHz. Other evidence can be found in the laser gyroscope field, which has measured data showing residual amplitude modulation that is over 60 dB less than conventional phase modulation approaches. The present invention is therefore able to address the need for an increased number of radios as well as the need for an increased number of signals with respect to modern day aviation platforms.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

While various preferred embodiments have been described, those skilled in the art will recognize modifications or variations which might be made without departing from the inventive concept. The examples illustrate the invention and are not intended to limit it. Therefore, the description and claims should be interpreted liberally with only such limitation as is necessary in view of the pertinent prior art.

What is claimed is:

1. A cosite interference rejection system comprising:
    an interference subsystem responsive to a transmit system, the interference subsystem weighting a sampled transmit signal based on a feedback signal such that the weighted signal is out of phase with the sampled transmit signal;
    an optical cancellation subsystem responsive to the interference subsystem and also to a receive antenna, the optical cancellation subsystem performing an interfering signal canceling operation in an optical domain by:
    converting a received RF signal having a desired signal component and an interfering signal component into a representative input optical signal; and
    optically processing the representative input optical signal in the optical domain to remove the interfering signal component.

2. The system of claim 1, further comprising a feedback loop for coupling said optical cancellation system with said interference subsystem, said feedback loop operating to enable a signal representative of said desired receive signal back to said interference subsystem.

3. The system of claim 1, wherein said optical cancellation system includes:
    an optical signal generator for generating an optical signal;
    a first optical modulator responsive to said received RF signal for modulating said optical signal in accordance with said received RF signal to produce said representative input optical signal.

4. The system of claim 3, wherein said optical cancellation system further includes a second optical modulator responsive to said interference subsystem and to said first optical modulator, for modifying said representative input optical signal in accordance with said weighted signal, to thus form an optical signal having said interfering component removed therefrom.

5. The system of claim 4, further comprising a demodulator for demodulating said optical signal that has said interfering component removed therefrom.

6. The system of claim 5, further comprising a feedback loop coupled between said demodulator and said interference subsystem for feeding an output signal from said demodulator to said interference subsystem.

7. The system of claim 4, further comprising a first optical signal medium for coupling optical signal generator and said first optical modulator, and a second optical medium for coupling said first and second optical modulators.

8. An interference rejection system comprising:
    an interference subsystem responsive to an RF transmit system, the interference subsystem weighting a sampled RF transmit signal based on a feedback signal such that the weighted signal is out of phase with the sampled transmit signal;
    an optical cancellation subsystem responsive to the interference subsystem and also to a received RF signal that includes both an interfering signal component from the RF transmit system, and a desired RF signal component, the optical cancellation subsystem including:
    an optical modulator that generates a representative input optical signal in accordance with said received RF signal, for assisting in performing a signal canceling operation in an optical domain to remove said interfering signal component from said received RF signal.

9. The system of claim 8, the optical cancellation system including:
    an optical signal generator; and
    said optical modulator being responsive to a receive antenna being used to receive said received RF signal, for generating a representative received input optical signal in accordance with said received RF signal.

10. The system of claim 9, the optical cancellation system further comprising an additional optical modulator responsive to both said interference subsystem and said optical modulator, for modifying said representative received input optical signal in accordance with said weighted signal generated by said interference subsystem to thus cancel said interfering signal component.

11. The system of claim 10, further comprising a demodulator for demodulating an output of said additional optical modulator.

12. The system of claim 11, further comprising a feedback loop for feeding back an output of said demodulator to said interference subsystem.

13. The system of claim 10, further comprising using a plurality of optical signal transmission mediums to couple said signal generator, said optical modulator and said additional optical modulator.

14. A method for canceling an interfering RF signal component from a received RF signal, comprising:
   a) sampling said interfering RF signal component and weighting said sampled, interfering RF signal to generate a weighted signal that is out of phase with said sampled, interfering RF signal;
   b) generating an optical signal in accordance with said weighted signal; and
   c) using said optical signal and said received RF signal to remove said interfering RF signal component from said received RF signal.

15. The method of claim 14, wherein operation b) comprises:
   using an optical signal generator to generate said optical signal; and
   modulating said optical signal in accordance with said received RF signal to generate a representative optical input signal.

16. The method of claim 15, further comprising further optically modulating said representative optical input signal in accordance with said weighted signal to cancel an adverse effect of said interfering RF signal component.

17. The method of claim 16, further comprising demodulating said representative optical input signal.

18. The method of claim 17, further comprising using said demodulated representative optical input signal in a subsequent weighting of said interfering RF signal component.

19. A mobile platform comprising an interference rejection system, the system including:
   an interference subsystem responsive to an RF transmit system, the interference subsystem weighting a sampled RF transmit signal based on a feedback signal such that the weighted signal is out of phase with the sampled transmit signal;
   an optical cancellation subsystem responsive to the interference subsystem and also to a received RF signal that includes both an interfering signal component from the RF transmit system, and a desired RF signal component, the optical cancellation subsystem including;
   an optical signal modulation system for modulating an optical signal in accordance with said weighted signal and operating to perform a signal canceling operation in an optical domain using said modulated optical signal to remove said interfering signal component from said received RF signal.

* * * * *